Sept. 18, 1962 D. C. LIVINGSTON 3,054,929

SWITCHING CIRCUIT FOR USE WITH ELECTROLUMINESCENT DISPLAY DEVICES

Filed Dec. 29, 1959 2 Sheets-Sheet 1

INVENTOR
DONALD C. LIVINGSTON
BY Theodore Jay Jr.
ATTORNEY

Sept. 18, 1962 D. C. LIVINGSTON 3,054,929

SWITCHING CIRCUIT FOR USE WITH ELECTROLUMINESCENT DISPLAY DEVICES

Filed Dec. 29, 1959 2 Sheets-Sheet 2

INVENTOR
DONALD C. LIVINGSTON
BY [signature]
ATTORNEY

United States Patent Office 3,054,929
Patented Sept. 18, 1962

3,054,929

SWITCHING CIRCUIT FOR USE WITH ELECTROLUMINESCENT DISPLAY DEVICES

Donald C. Livingston, Bayside, N.Y., assignor to Sylvania Electric Products Inc., a corporation of Delaware Filed Dec. 29, 1959, Ser. No. 862,541
5 Claims. (Cl. 315—169)

This invention relates to switching circuits and in particular to switching circuits for use with electroluminescent display devices.

One form of electroluminescent display device consists of an electroluminescent film or layer having first and second mutually orthogonal arrays of parallel, separated, electrical conductors positioned on each side thereof to form a crossed-grid structure. When a suitable voltage is applied between a selected conductor of the first array and a selected conductor of the second array, the portion of the electroluminescent layer located at the intersection of the selected conductors is caused to glow. The degree of luminescence which this portion (defined as a cell) exhibits is dependent upon the magnitude and frequency of the applied voltage.

It has been found that if the applied voltage is switched in succession from cell to cell, then each cell will luminesce in turn producing an effect similar to that resulting from the scanning action developed in the cathode ray tube of a conventional television receiver. The apparatus required to perform this switching must be simple yet function rapidly and with a high degree of reliability.

Accordingly, it is an object of the present invention to provide an improved switching circuit.

Another object is to provide an improved switching circuit which permits the successive energization of a large number of electroluminescent cells, or other devices, rapidly and with a high degree of reliability.

Still another object is to provide an improved switching circuit for use with electroluminescent panels in which relatively inexpensive diodes and other components may be used.

A further object is to provide an improved switching circuit which permits the selective energization of a plurality of electroluminescent cells in a sequence determined by an applied input signal.

In the present invention, a switching circuit is provided in which the voltage across a load element is controlled by the impedance of the output windings of one or more square-loop magnetic cores. The impedance of each of the output windings is determined by the presence or absence of direct current in an associated control winding, a direct current of sufficient magnitude saturating the core and reducing the output winding impedance from a high value to a relatively low value. A biasing circuit is provided to prevent current flow through the control winding in the absence of an input signal. This bias is overcome by the application of an appropriate input signal to the switching circuit.

The switching circuit described is particularly adapted for use with a crossed-grid electroluminescent structure having spaced first and second arrays of parallel, separated electrical conductors. These conductor arrays are generally perpendicular to each other although the angle between them may have any value greater than zero degrees. A layer of electroluminescent material, placed between the two arrays of conductors, responds to the presence of an electric field by emitting light in the areas encompassed by the applied field.

The electrical conductors in the first array are connected to one terminal of an alternating voltage source through the output windings of a first set of magnetic cores, while the electrical conductors in the second array are each coupled to the other terminal of the alternating voltage source through the output windings of a second set of magnetic cores. Thus, each of the phosphor cells located between intersecting conductors is part of a series circuit consisting of the output windings of two magnetic cores and the alternating voltage source.

In addition to an output winding, each of the magnetic cores is provided with a control winding. When the D.-C. current through the control winding is zero or has a relatively low value, the core possesses high permeability and, therefore, the output winding presents a high impedance to alternating current. The impedance of the output winding when the core is in its unexcited or normal state is many times higher than that of the phosphor cell. As a result, the voltage across a cell in series with two unexcited cores is very low and the cell will not luminesce. However, if a D.-C. current of proper magnitude is permitted to flow through each of the control windings of the cores in series with one of the cells, these cores saturate, thereby causing the impedance of their output windings to decrease to a low value. An appreciable portion of the total alternating voltage will then appear across the cell, causing it to be energized and emit light.

Magnetron beam switching tubes are used to control the flow of current through the control windings of the magnetic cores. Each of the control windings is connected to a D.-C. voltage source by means of one or more beam switching tubes. When a suitable control voltage is applied to the appropriate beam switching elements of the tubes connected to the cores associated with a selected phosphor cell, a D.-C. current is caused to flow through the control windings of these cores thereby producing an abrupt decrease in the impedance of each of the associated output windings.

In one embodiment of the invention, a biasing circuit is used to prevent D.-C. current from flowing in the control winding of a core unless at least two beam switching tubes have been simultaneously energized. This is accomplished by coupling a rectifier and an impedance element in series with the control winding and connecting this series combination across a D.-C. voltage source, the rectifier being poled with respect to the battery so as to be normally non-conductive. If less than a predetermined number of the beam switching tubes controlling the current through the control winding are energized, the voltage drop across the impedance element will not be sufficient to cause the rectifier to conduct. However, if all the beam switching tubes controlling the core are conducting at the same time, the voltage drop across the impedance will be great enough to unblock the rectifier and sufficient current will flow through the control winding to produce saturation of the magnetic core.

The above objects of the present invention and the brief introduction thereto will be more fully understood and further objects and advantages will become apparent from a study of the following detailed description in connection with the drawings wherein.

Figure 1:
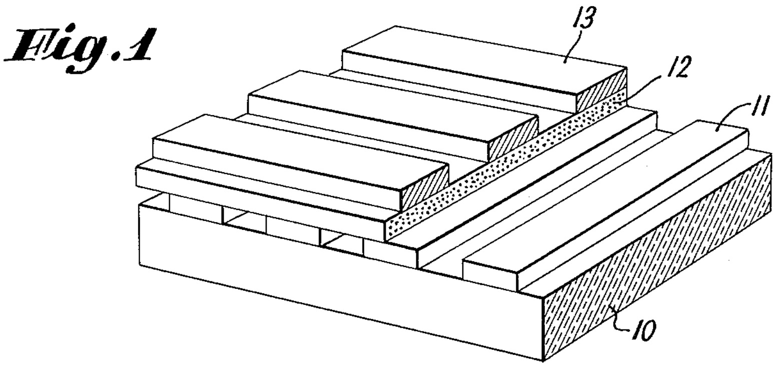
FIG. 1 is a section of a typical crossed-grid electroluminescent structure.

Referring to FIG. 1, there is shown a typical electroluminescent crossed-grid structure comprising a glass plate 10, a first array of horizontal, transparent, electrical conductors 11, an electroluminescent layer 12 and a second array of vertical electrical conductors 13. When a selected one of the horizontal conductors 11 and a selected one of the vertical conductors 13 are energized, an electric field is produced between them causing the phosphor cell at the intersection of the two conductors to luminesce. If voltages are applied to the conductors sequentially, a scanning action is obtained, the cells luminescing one after the other in a predetermined pattern.

Figure 2:
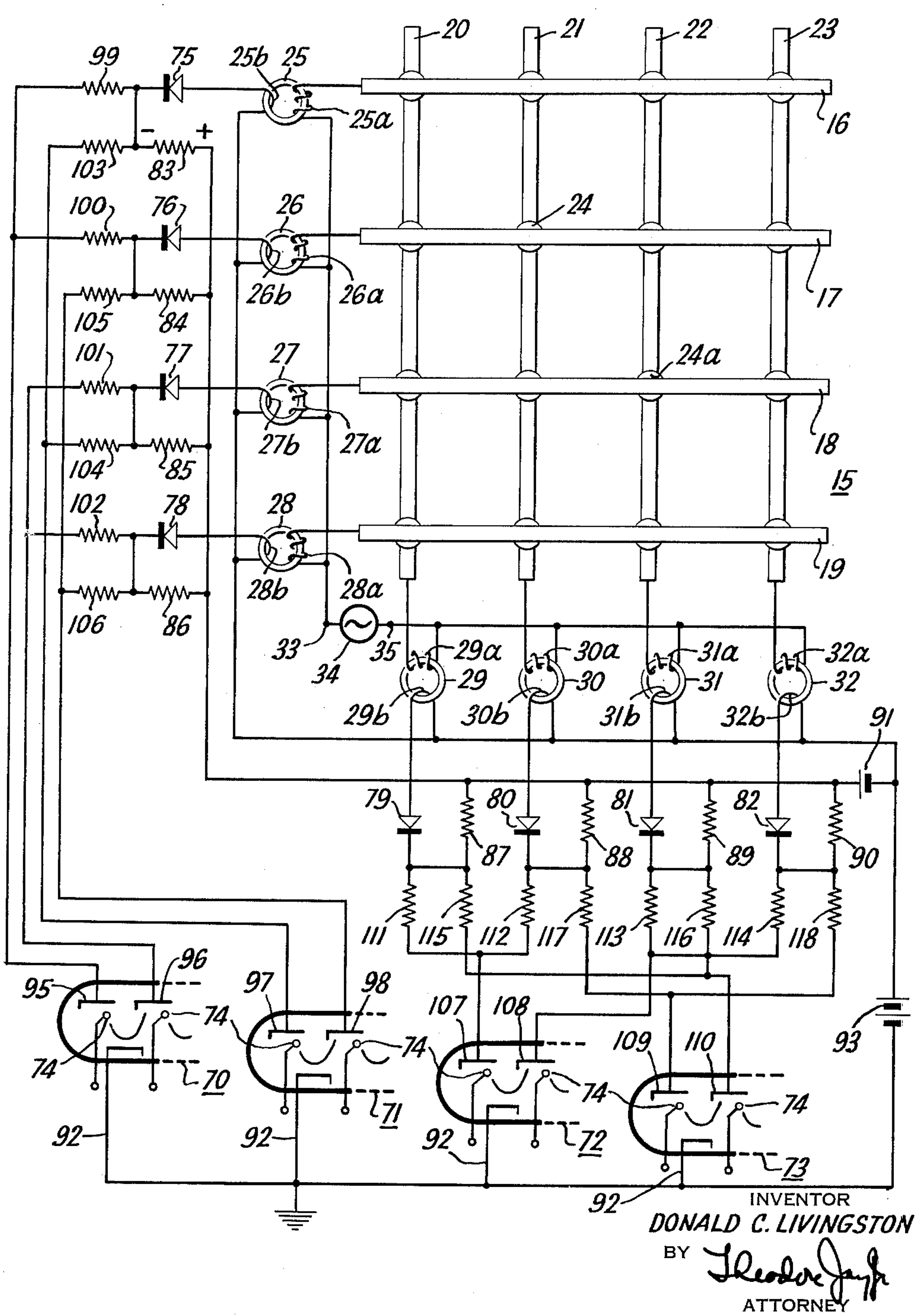
FIG. 2 is a schematic diagram of an embodiment of the invention in which each magnetic core is controlled by a pair of beam switching tubes.

FIG. 2 is a schematic diagram of the switching apparatus of this invention used in conjunction with a crossed-grid electroluminescent panel 15 of the type depicted in FIG. 1. Panel 15 is shown schematically as consisting of four horizontal conductors 16, 17, 18, and 19 and four vertical conductors 20, 21, 22, and 23. Only four conductors are shown in each direction for simplicity, but it will be understood that in a practical structure one hundred or more conductors may be provided in each direction. A phosphor cell is shown graphically by a circle located at the intersection of each of the conductors. Thus, phosphor cell 24 would be activated by energizing electrical conductors 21 and 17 by a suitable alternating voltage and phosphor cell 24*a* by applying a voltage to conductors 18 and 22.

Magnetic cores 25, 26, 27, and 28 are associated with each of the horizontal conductors 16—19 and magnetic cores 29, 30, 31, and 32 are associated with each of the vertical conductors 20—23. The output windings 25*a*—28*a* each have one end connected to the horizontal conductors 16—19 respectively, and their other ends connected to terminal 33 of an alternating voltage source 34. The output windings 29*a*—32*a* of cores 29, 30, 31, and 32 each have one end connected to conductors 20—23 respectively while the other ends of these windings are connected to terminal 35 of alternating voltage source 34.

In addition to the output windings 25*a*—32*a*, the magnetic cores are provided with control windings 25*b*—32*b*. When there is no current flowing through the control winding of a magnetic core, the permeability of the core is high. Therefore, the impedance presented by its output winding is also high. This can be seen by referring to FIG. 3 which is a plot of the flux density B in a magnetic core as a function of field intensity H.

Figure 3:
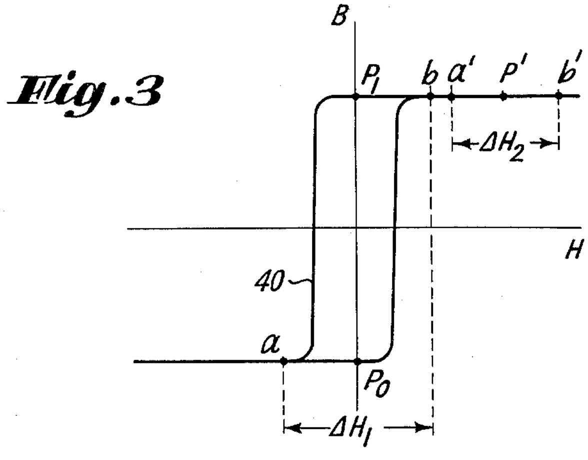
FIG. 3 is a hysteresis curve of a magnetc core of the type shown in FIG. 2.

In the absence of current in the control winding, the applied voltage from alternating voltage source 34 causes the operating point on the hysteresis loop 40 to traverse a path which is symmetrical about the center of the loop. The magnitude of the peak-to-peak swing in the magnetic field strength H induced within the core by the current in the output winding is indicated in FIG. 3 as $\Delta H_1$. As the current in the output winding varies sinusoidally through each cycle, the operating point on the hysteresis loop passes from point $P_0$ at the bottom of hysteresis loop 40 through point *b* at the upper right-hand corner of the loop, to the left through $P_1$ down to point *a*, and back to point $P_0$, this path being repeated cyclically. Thus, during each cycle, there is a large change in flux density B for a given change in magnetic field intensity H and the incremental inductance of the output winding (which is proportional to the slope of the B–H curve) will therefore have an appreciable magnitude. At the frequencies used to excite the electroluminescent layer, the impedance of the output winding is many times greater than the impedance of the electroluminescent cell. Consequently, most of the voltage appears across the output windings and the voltage across the electroluminescent cell is negligible. For example, as illustrated in FIG. 2, voltage is coupled across cell 24 by a series connection consisting of conductor 17, output winding 26*a*, alternating voltage source 34, output winding 30*a*, and conductor 21. Since the impedance of windings 26*a* and 30*a* is considerably higher than the impedance of cell 24, the voltage across cell 24 will be too small to cause luminescence.

When direct current flows in the control winding of a core, the operating point shifts to a new position such as P′ on the hysteresis loop of FIG. 3. As the magnitude of voltage source 34 varies sinusoidally, the operating point moves back and forth cyclically between points *a′* and *b′*, the magnetic field strength having a peak-to-peak swing equal to $\Delta H_2$. The change in flux density B is virtually zero in this region of the hysteresis loop, and the incremental inductance of the output winding is therefore very low. Since the inductance of the output winding is low, its impedance is low and the voltage developed across it will be low. Thus, if cores 26 and 30 are saturated by biasing currents of sufficient magnitude flowing through their control windings 26*b* and 30*b*, the voltage appearing across electroluminescent cell 24 will be increased to a value sufficient to cause luminescence.

Figure 4:
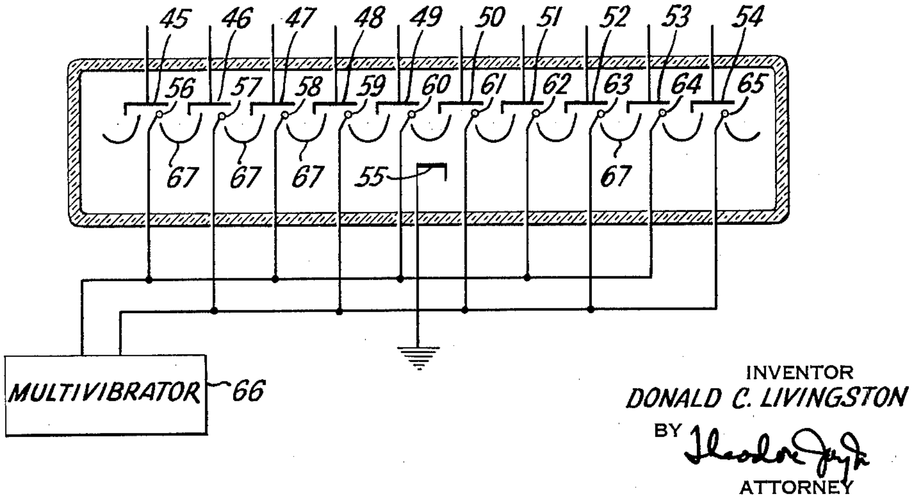
FIG. 4 is a schematic representation of a typical beam switching tube.

The current through the control winding of each of the magnetic cores 25—32 is controlled by a pair of magnetron beam switching tubes which may be similar to a tube known commercially as Burroughs type 6700. A schematic diagram of a typical beam switching tube having ten target electrodes, or anodes, 45—54 and a cathode 55 is shown in FIG. 4. These tubes are well known and it will be understood by those familiar with the art that the electron beam emanating from cathode 55 is switched from one target electrode to the next as the beam switching elements 56—65 are alternately reduced in potential by the output pulses from multivibrator 66. With the connections shown, the electron beam will be switched from one target electrode to the adjacent electrode at a rate determined by the frequency of the multivibrator. If it is desired to switch from a first electrode to another electrode not immediately adjacent to the first, this may be accomplished by applying negative pulses at a high rate of speed to each of the beam switching elements 56—65, in turn, until the desired electrode is reached. By making the repetition frequency of the pulse train high, current will flow in the intermediate target electrodes for too brief an interval to permit appreciable saturation of the cores connected to them. Only the control winding coupled to the last target electrode pulsed will conduct an appreciable current. The voltage connections to the spade elements 67 have not been shown, and the tube has been depicted schematically instead of in its usual cylindrical form in order to avoid complicating the drawing.

In FIG. 2, two beam switching tubes 70 and 71 govern current flow through the control winding of magnetic cores 25—28, while beam switching tubes 72 and 73 control the flow of current through the control windings of cores 29—32. Only two of the ten target electrodes in tubes 70—73 are shown in FIG. 2. If, however, a crossed-grid structure having one hundred horizontal and one hundred vertical conductors were used, then each of the ten target electrodes would be coupled to ten control windings.

When the beam switching elements 74 of tubes 70—73 are deenergized, the current through control windings 25*b*—32*b* is negligible because of the blocking action of diodes 75—82 connected in series with control windings 25*b*—32*b* and resistors 83—90, respectively. Each of these series circuits is connected in parallel with a D.-C. voltage source 91, the positive terminal of battery 91 being connected to resistors 83—90 and the negative terminal to control windings 25*b*—32*b*. As shown, diodes 75—82 are so poled with respect to the polarity of voltage source 91 as to oppose the flow of current through the control windings.

The cathodes 92 of beam switching tubes 70—73 are grounded and connected to the negative terminal of D.-C. voltage source 93, the positive terminal of source 93 being coupled to the negative terminal of source 91. The target electrodes 95, 96 of tube 70 and the target electrodes 97, 98 of tube 71 are connected to diodes 75—78 through suitable resistors, one target electrode from each tube being coupled to each of the diodes. Thus, electrode 95 is connected through resistors 99 and 100 to diodes 75 and 76, respectively, electrode 96 through resistors 101 and 102 to diodes 77 and 78, respectively, electrode 97 through resistors 103 and 104 to diodes 75 and 77, respectively, and electrode 98 through resistors 105 and 106 to diodes 76 and 78, respectively. In a similar manner, target electrodes 107—110 are coupled through resistors 111—118 to diodes 79—82.

If the beam switching element 74 associated with target electrode 95 is energized, current will flow from electrode 95 to cathode 92 of switching tube 70 and then traverse a path comprising voltage source 93, voltage source 91, resistor 83, resistor 99, back to the target electrode 95. A voltage drop will be produced across resistor 83 (with the polarity shown) causing the terminal of diode 75 connected to resistor 83 to be lowered in potential. The ohmic value of resistor 83 is chosen, however, so that the current drawn by one beam switching tube will not produce sufficient voltage drop to cause rectifier 75 to conduct. Thus, even though beam switching tube 70 is conducting, no current will flow through control winding **25*b* and the impedance presented by output winding 25*a* will remain high. If the beam switching element 74 associated with target electrode 97 of beam switching tube 71 is now energized, the current through resistor 83 will be doubled and the voltage drop across 83 will also be doubled. Under these conditions, diode 75 will become conductive and current will flow through control winding 25*b*, causing core 25** to saturate and operate at point P′ on the hysteresis loop of FIG. 3.

In this way, the voltage across each phosphor cell may be increased to a value which will produce luminescense. For example, to excite cell 14, the beam switching elements 74 associated with target electrodes 95, 98, 107, and 109 of tubes 70—73, respectively, are excited by an external signal. The resulting current will produce sufficient voltage drop across resistors 84 and 88 to cause diodes 76 and 80 to conduct, thereby permitting almost all the beam switching tube current to flow through control windings **26*b* and 30*b* and saturate cores 26 and 30. In a similar manner, each of the other cells of the electroluminescent panel 15** may be energized.

A significant feature of this invention is that extremely high-speed beam switching tubes are used in conjunction with magnetic cores to provide rapid, reliable scanning of an electroluminescent device. When used for the control of an electroluminescent display panel, the rapid response of this switching circuit makes it possible to energize the individual phosphor cells in any predetermined order and at a speed governed only by the response of the electroluminescent material used. Another important feature is that the diodes used in the circuit are not subjected to high voltages. The voltage across each diode cannot exceed the magntiude of the voltage from source 91 and, since source 91 is used only to bias diodes 75—82, its voltage may be relatively low. Thus, inexpensive, rugged diodes may be used.

As many changes could be made in the above construction and many different embodiments could be made without departing from the scope thereof, it is intended that all matter contained in the above description or shown in the accompanying drawing shall be interpreted as illustrative and not in a limiting sense.

What is claimed is:

1. In combination with an electroluminescent device including first and second spaced arrays of parallel separated electrical conductors, the conductors in said first array passing over the conductors in said second array to form a plurality of crossover points, said first array of conductors extending along a first direction and said second array of conductors extending along a second and non-parallel direction, and an electroluminescent cell located between said conductors at each crossover point, apparatus for selectively applying an alternating voltage source across said electroluminescent cells comprising a plurality of single-apertured ring-shaped magnetic cores each having an output winding and a control winding, one end of the output winding on each of said magnetic cores being connected to a corresponding one of said electrical conductors and the other end of said output winding being adapted for connection to said alternating voltage source; a plurality of biasing circuits, one of said biasing circuits being coupled to the control windings on each of said plurality of magnetic cores, each of said biasing circuits being adapted to conduct a direct current through its associated control winding in response to a control signal; and switching means coupled to each of said biasing circuits, said switching means rendering selected biasing circuits conductive or nonconductive in response to an external signal.

2. In combination with an electroluminescent device including first and second spaced arrays of parallel separated electrical conductors, the conductors in said first array passing over the conductors in said second array to form a plurality of crossover points, said first array of conductors extending along a first direction and said second array of conductors extending along a second and non-parallel direction, and an electroluminescent cell electrically coupled between said conductors at each crossover point, apparatus for selectively applying an alternating voltage source across said electroluminescent cells comprising a plurality of single-apertured ring-shaped magnetic cores each having an output winding and a control winding, one end of the output winding on each of said magnetic cores being connected to a corresponding one of said electrical conductors and the other end of said output winding being adapted for connection to said alternating voltage source, a direct voltage source, a plurality of rectifying elements coupled in series with said control winding and said direct voltage source, said rectifiers being poled with respect to said direct voltage source so as to be normally non-conducting, and switching means coupled to each of said rectifying elements, said switching means reversing the polarity of the potential difference across selected rectifying elements in response to an applied signal thereby rendering said rectifying elements conductive.

3. An electroluminescent device comprising first and second spaced arrays of parallel separated electrical conductors, the conductors in said first array passing over the conductors in said second array to form a plurality of crossover points, said first array of conductors extending along a first direction and said second array of conductors extending along a second and non-parallel direction, an electroluminescent cell located between said conductors at each crossover point, a plurality of single-apertured ring-shaped magnetic cores each having an output winding and a control winding, one end of the output winding on each of said magnetic cores being connected to a corresponding one of said electrical conductors and the other end of said output winding being adapted to receive an alternating voltage, and biasing means adapted to receive a direct voltage connected to said control winding, said biasing means coupling said direct voltage to said control winding in response to an applied signal.

4. In combination with an electroluminescent device including first and second spaced arrays of parallel separated electrical conductors, the conductors in said first array passing over the conductors in said second array to form a plurality of crossover points, said first array of conductors extending along a first direction and said second array of conductors extending along a second and non-parallel direction, apparatus for applying an alternating voltage source across a selected crossover point comprising first and second sets of single-apertured ring-shaped magnetic cores, each of said cores having an output winding and a control winding, means coupling one end of each of the output windings in said first set of magnetic cores to an associated electrical conductor of said first array; means coupling one end of each of the output winding in said second set of magnetic cores to an associated electrical conductor of said second array, the other end of each output winding of said first set being adapted for connection to one terminal of said alternating voltage source and the other end of each output winding of said second set being adapted for connection to the other terminal of said alternating voltage source, and biasing means adapted to receive a direct voltage connected to said control winding, said biasing means coupling said direct voltage to said control winding in response to an applied signal.

5. Switching apparatus comprising first and second arrays of parallel separated electrical conductors, the conductors in said first array passing over the conductors in said second array to form a plurality of cross-over points, said first array of conductors extending along a first direction and said second array of conductors extending along a second and non-parallel direction, first and second sets of single-apertured ring-shaped magnetic cores, each of said cores having a control winding and an output winding, means coupling one end of each of the output widings in said first and seconds sets of magnetic cores to associated electrical conductors in said first and second arrays respectively, first and second terminal means coupled to the other ends of the output windings of said first and second sets of magnetic cores respectively, said first and second terminal means being adapted to receive an applied voltage therebetween, biasing circuit means associated with each of said magnetic cores, said biasing circuit means including rectifying means coupled to one end of said control winding, impedance means coupled to said rectifying means, and means for coupling a first source of voltage between said impedance means and the other end of said control winding, a plurality of switching tubes, each of said switching tubes having a cathode and a plurality of anodes, means coupling each of said anodes to the junction between the rectfying means and the impedance means of at least one of said biasing circuit means, and means for coupling a second source of voltage between the cathodes of said switching tubes and the other ends of said control windings.

References Cited in the file of this patent

UNITED STATES PATENTS

| | | |
|---|---|---|
| 2,774,813 | Livingston | Dec. 18, 1956 |
| 2,955,231 | Aiken | Oct. 4, 1960 |

OTHER REFERENCES

Proceedings of the I.R.E., November 1958, pp. 1808 to 1824.